UNITED STATES PATENT OFFICE.

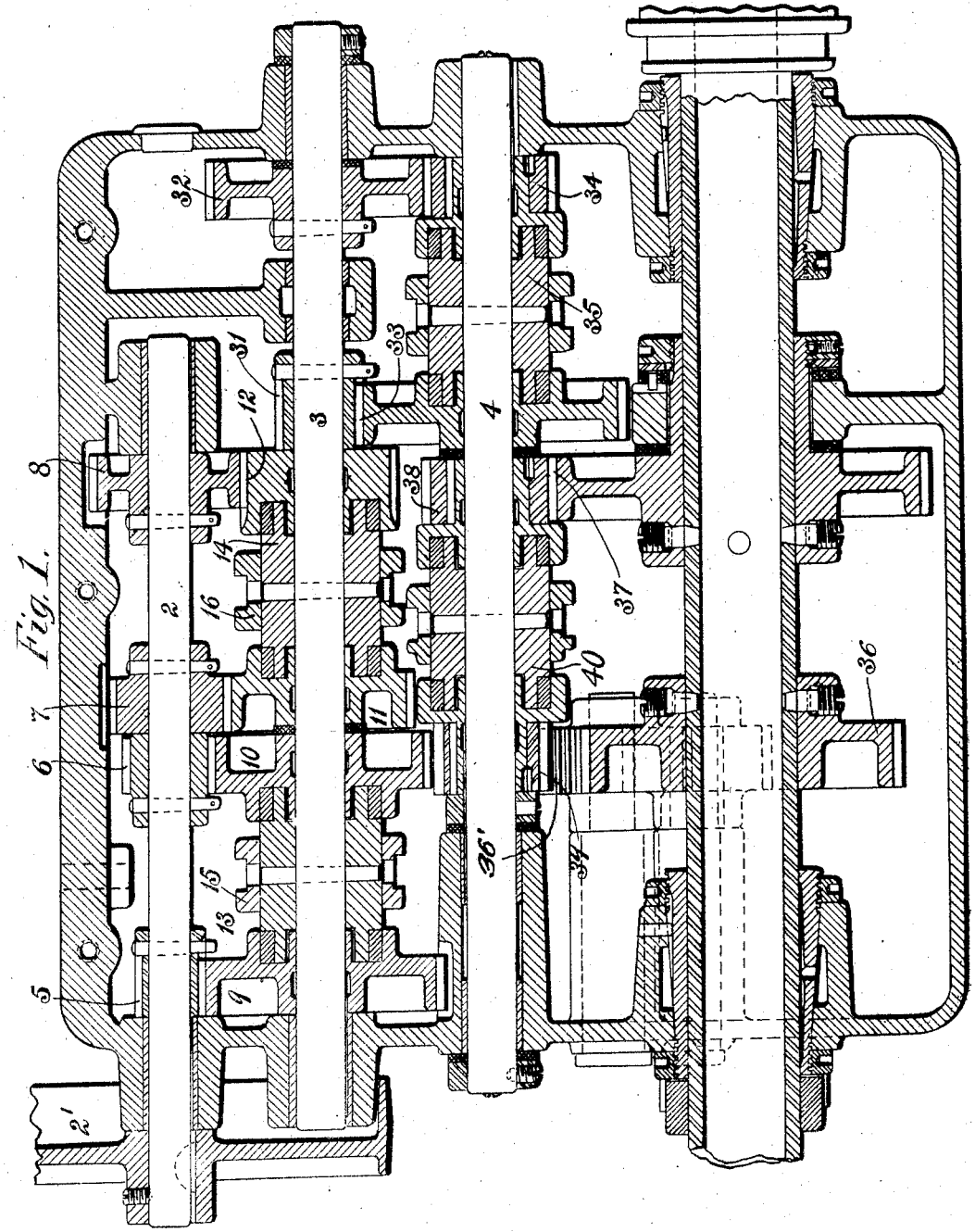

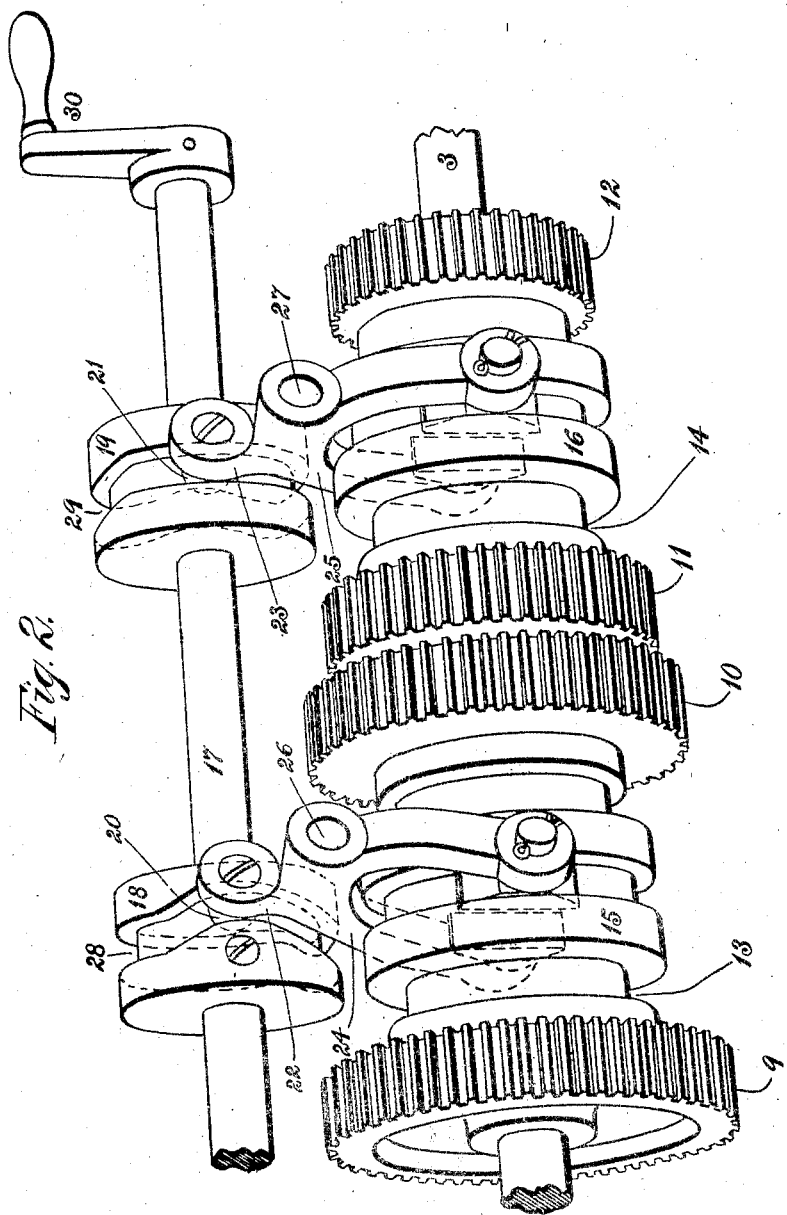

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

VARIABLE-SPEED MECHANISM.

No. 905,519.

Specification of Letters Patent.

Patented Dec. 1, 1908.

Application filed March 19, 1907. Serial No. 363,396.

*To all whom it may concern:*

Be it known that I, BENGT M. W. HANSON, a citizen of Sweden, residing at Hartford, in the county of Hartford and State of Connecticut, have invented certain new and useful Improvements in Variable-Speed Mechanism, of which the following is a specification.

This invention relates to variable-speed gearing involving improved clutch-actuating mechanism, and has for its object the provision of a simple device by means of which a series of clutches may be perfectly controlled by a shaft rotated in any desired manner.

Other objects of the invention will be set forth in the following description.

In the accompanying drawings, Figure 1 is a sectional view of the spindle, driving-shaft and intermediate change-gear shafts of a metal-working or other machine, the line of section being an assumed one for the purpose of providing a comprehensive illustration. Fig. 2 is a perspective view showing the relative position of a cam-shaft to one of the intermediate gear-shafts.

Referring to the drawings, the numeral 1 designates the spindle, 2 the driving-shaft carrying a pulley 2′, and 3 and 4 the intermediate shafts. Keyed or pinned to shaft 2 are four gears 5, 6, 7 and 8 of different diameters adapted to mesh with variable size gears 9, 10, 11 and 12, respectively, which gears are loosely mounted on shaft 3. Between gears 9 and 10, 11 and 12 is mounted clutch-mechanism 13 and 14, respectively, shown as of the friction-ring variety, although it may be of any suitable kind, and adapted to be operated by shiftable sleeves 15 and 16 mounted on the clutch-barrels.

Adjacent to shaft 3 is a shaft 17 having mounted thereon a pair of cams 18 and 19, grooved to receive roller-studs 20, 21, respectively, which project from the short arms 22 and 23 of forked clutch-operating levers 24, 25 pivoted at 26 and 27 to any suitable support (not shown). Cam-grooves 28, 29 are of such contour that on one revolution of the cam-shaft 17, said cams will shift the clutch-sleeves 15 and 16 from a neutral position and cause the gears 9, 10, 11 and 12 to be successively clutched to and released from shaft 3.

It is obvious from the above that four different speeds may be transmitted from the driving-shaft 2 to said gear-shaft 3, and that any of the four combinations may be readily established by turning the cam-shaft 17, for which purpose a crank-handle 30 is shown secured to the end thereof, although it is distinctly to be understood that other means may be employed for actuating said cam-shaft without departure from the invention.

Adjacent to one end of shaft 3 are keyed or pinned two gears 31 and 32 of different diameters and in mesh with these gears are gears 33 and 34, respectively, which are loosely mounted on shaft 4. Clutch-mechanism 35 is provided between gears 33 and 34 by means of which either gear may be clutched to shaft 4 as desired. By this arrangement of gearing provision is made whereby two speeds may be transmitted to shaft 4 from each speed of shaft 3, thus making eight different speeds available for shaft 4.

Two gears 36 and 37 are rigidly mounted on spindle 1, the latter being in mesh with a gear 38 loosely mounted on shaft 4, and the former with an intermediate gear 36′ which is in mesh with gear 39, also loosely mounted on shaft 4. Clutch-mechanism 40 is mounted on shaft 4 between gears 38 and 39, so that either of said gears may be made rigid with shaft 4 by shifting said clutch 40. Spindle 1 is caused to rotate in one direction by gear 38 and in the other direction by gear 39. Each of the eight different speeds of shaft 4 may be converted in transmission to the spindle, into the proper relative speed for said spindle.

As is obvious the part 1 may be a solid shaft instead of a chuck-spindle as shown. So too changes may be made in the proportions or sizes of the gears and in the character thereof,—the invention not being limited to the toothed gearing illustrated.

Having thus described the invention, what I claim is—

The combination of a rotary driving shaft having at least four gears fastened thereto and of different diameters, an intermediate shaft having four gears loose thereon, also of different diameters, arranged in pairs and meshing with said first mentioned gears, respectively, clutch-members fastened to said intermediate shaft and arranged to clutch any one of said four loose gears to said intermediate shaft, a pair of gears of different diameters fastened to said intermediate shaft, a second intermediate shaft, a pair of gears loose on the second intermediate shaft, meshing with the pair of gears, respectively, which are fastened to said first intermediate shaft, both said last mentioned pairs of gears being of different diameters, a clutch member fastened to said second intermediate shaft and adapted to alternately clutch the last mentioned pair of loose gears to said second intermediate shaft, two gear trains one of which has one more gear than the other and constituting an idler, the primary gears of said trains being loose on the second intermediate shaft, a spindle to which the final gears of said trains are fastened, and a clutch member for alternately clutching the primary gears of said trains to said second intermediate shaft.

In testimony whereof I affix my signature in presence of two witnesses.

BENGT M. W. HANSON.

Witnesses:
F. E. ANDERSON,
FRANCES E. BLODGETT.